(12) United States Patent
Nowak et al.

(10) Patent No.: US 8,022,130 B2
(45) Date of Patent: *Sep. 20, 2011

(54) ADHESIVE AND SEALANT SYSTEMS

(75) Inventors: Rüdiger Nowak, Kahl (DE); Werner Michel, Lützelbach (DE); Pia Buckel, Bruchköbel (DE)

(73) Assignee: Evonik Degussa GmbH, Essen (DE)

( * ) Notice: Subject to any disclaimer, the term of this patent is extended or adjusted under 35 U.S.C. 154(b) by 87 days.

This patent is subject to a terminal disclaimer.

(21) Appl. No.: 10/595,853

(22) PCT Filed: Nov. 17, 2004

(86) PCT No.: PCT/EP2004/013017
§ 371 (c)(1),
(2), (4) Date: May 16, 2006

(87) PCT Pub. No.: WO2005/054390
PCT Pub. Date: Jun. 16, 2005

(65) Prior Publication Data
US 2007/0129480 A1   Jun. 7, 2007

(30) Foreign Application Priority Data
Dec. 1, 2003   (DE) ................. 103 56 042

(51) Int. Cl.
C08K 3/34 (2006.01)
(52) U.S. Cl. ........ 524/493; 524/492; 524/556; 524/557; 524/563; 524/567
(58) Field of Classification Search ............. 524/493, 524/556, 557, 567, 563
See application file for complete search history.

(56) References Cited

U.S. PATENT DOCUMENTS

| | | | | |
|---|---|---|---|---|
| 4,307,023 A * | 12/1981 | Ettlinger et al. | ............ | 524/268 |
| 4,704,425 A * | 11/1987 | Lagarde et al. | ............ | 524/492 |
| 4,877,595 A * | 10/1989 | Klingle et al. | ............ | 423/335 |
| 5,132,343 A * | 7/1992 | Zwecker et al. | ............ | 523/518 |
| 5,136,500 A | 8/1992 | Lemay et al. | | |
| 5,447,968 A * | 9/1995 | Barnett et al. | ............ | 523/142 |
| 5,959,005 A * | 9/1999 | Hartmann et al. | ............ | 523/213 |
| 6,156,285 A * | 12/2000 | Adams et al. | ............ | 423/335 |
| 6,193,795 B1 | 2/2001 | Nargiello et al. | | |
| 7,095,929 B2 * | 8/2006 | Nowak et al. | ............ | 385/100 |
| 7,144,930 B2 * | 12/2006 | Meyer et al. | ............ | 523/216 |
| 2001/0047047 A1 * | 11/2001 | Nowak et al. | ............ | 524/430 |
| 2002/0037936 A1 * | 3/2002 | Michael et al. | ............ | 516/111 |
| 2002/0197311 A1 * | 12/2002 | Hasenzahl et al. | ............ | 424/465 |
| 2003/0130413 A1 * | 7/2003 | Gruenewaelder et al. | .... | 524/589 |
| 2003/0195290 A1 | 10/2003 | Scholz et al. | | |
| 2005/0232556 A1 * | 10/2005 | Nowak et al. | ............ | 385/100 |

FOREIGN PATENT DOCUMENTS

| | | |
|---|---|---|
| DE | 199 61 933 A1 | 7/2001 |
| EP | 1 000 984 A1 | 5/2000 |
| WO | WO 01/90271 * | 11/2001 |
| WO | 03/029338 A1 | 4/2003 |
| WO | WO 03097713 A1 * | 11/2003 |

OTHER PUBLICATIONS

Recommended products for sealants. Evonik 2009. Online at: http://www.aerosil.com/product/aerosil/en/industries/application-areas/adhesives-sealants/recommended-products-sealants/pages/default.aspx.*
Machine Translation of WO 03097713 A1, Nov. 2003.*

* cited by examiner

*Primary Examiner* — Milton I Cano
*Assistant Examiner* — Darcy D Laclair
(74) *Attorney, Agent, or Firm* — Smith, Gambrell & Russell, LLP

(57) ABSTRACT

Adhesive and sealant systems based on epoxy resins, polyurethane, silane-terminated polymers, silicones, unsaturated polyester resins, vinyl ester resins, acrylates, polyvinyl acetate, polyvinyl alcohol, polyvinyl ether, ethylene vinyl acetate, ethylene-acrylic acid copolymers, polyvinyl acetates, polystyrene, polyvinyl chloride, styrene-butadiene rubber, chloroprene rubber, nitrile rubber, butyl rubber, polysulfide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulfones, which contain 1 wt. % to 15 wt. % of a compacted, hydrophobic pyrogenic silica.

5 Claims, No Drawings

ADHESIVE AND SEALANT SYSTEMS

REFERENCE TO RELATED APPLICATIONS

This application claims the benefit of German priority Application No. 103 56 042.4 filed Dec. 1, 2003, and International Application No. PCT/EP2004/013017 filed Nov. 17, 2004, which are relied on and incorporated herein by reference.

BACKGROUND OF THE INVENTION

The invention concerns adhesive and sealant systems.

Adhesive and sealant systems are known from Ullmanns Enzyklopädie der technischen Chemie, 4$^{th}$ Edition, Volume 14, page 227 (1997).

They consist of high-polymeric substances having as good strength as possible. Most adhesives and sealants contain high-molecular-weight organic substances as the basic raw materials or reactive organic compounds which are precursors of polymeric substances and which react during the adhesive and sealing process to form polymers.

It is known that for various adhesive and sealant systems, based for example on epoxy resin, polyurethane resin or vinyl ester resin, hydrophobic, pyrogenic silicas are very effective thixotropic agents in comparison to hydrophilic, pyrogenic silicas. Moreover, such adhesive and sealant systems can be made more stable in storage with hydrophobic, pyrogenic silicas than with hydrophilic, pyrogenic silicas (Degussa Schriftenreihe Pigmente (2001) No. 27 and No. 54).

Owing to their fine-particle character, known pyrogenic silicas give rise, to increased dust formation and a long incorporation or wetting time in liquid systems.

It is also known (Degussa Schriftenreihe Pigmente No. 63, 2001, page 25) that due to compaction, pyrogenic hydrophilic silica can be incorporated into the binder in a shorter incorporation time, using a high-speed mixer or high-speed planetary mixer for example.

The incorporation time is understood to be the time during incorporation in which the fine-particle silica has completely disappeared from the surface of the binder and is wetted with the binder. Depending on the batch size, dispersing unit and formulation, the incorporation time can last for up to several hours and in many applications it is therefore the speed-determining step for the preparation of the product.

Compacting the silica reduces the formation of dust by the silica. The lower volume of the compacted silica can also be advantageous in the design of dispersing units.

Disadvantageously, in most applications the viscosity of the binder containing pyrogenic silica decreases markedly during compaction as the compacted bulk density of the pyrogenic silica increases. In the same way the dispersibility of the silica deteriorates during compaction as the compacted bulk density increases. This is manifested for example in the form of speck formation and greater surface roughness. Both effects are significant disadvantages. For that reason the use of compacted hydrophilic, pyrogenic silica in adhesives and sealants is relatively limited.

The object is therefore to produce adhesive and sealant systems in which the above disadvantages do not occur.

SUMMARY OF THE INVENTION

The invention provides adhesive and sealant systems based on epoxy resins, polyurethane, silane-terminated polymers, silicones, unsaturated polyester resins, vinyl ester resins, acrylates, polyvinyl acetate, polyvinyl alcohol, polyvinyl ether, ethylene vinyl acetate, ethylene-acrylic acid copolymers, polyvinyl acetates, polystyrene, polyvinyl chloride, styrene-butadiene rubber, chloroprene rubber, nitrile rubber, butyl rubber, polysulfide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulfones, which are characterised in that they contain 1 wt. % to 15 wt. % of a compacted, hydrophobic, pyrogenic silica.

The invention can preferably provide a 2-component mixed system or a 1-component system.

DETAILED DESCRIPTION OF INVENTION

Sealants can be:

Non-metallic both plastic and elastic materials having adhesive properties for filling joints and cavities between material junctions, which after setting adhere to the edges of the material and seal the joints against environmental media. As with adhesives, sealants are divided into physically setting and chemically curing (crosslinking) systems. In addition to the base polymer, sealants contain as additional components for example plasticisers, solvents (e.g. ketones), water, fillers (e.g. chalk), thixotropic agents (e.g. pyrogenic silica), bonding agents (e.g. silanes), pigment pastes (e.g. carbon black), and other additives (for example catalysts, antioxidants).

Adhesives can be:

Non-metallic substances which can join adherends through surface bonding and inner strength (adhesion and cohesion). Adhesives can thus be understood to be products which, according to their chemical composition and the prevailing physical condition at the time of application onto the adherends to be joined, allow the surfaces to be wetted and form the adhesive film in their glue lines that is needed for the transmission of force between the adherends. In addition to the base polymer, adhesives contain similar components to sealants, such as for example solvents (e.g. ketones), water, fillers (e.g. chalk), thixotropic agents (e.g. pyrogenic silica), bonding agents (e.g. silanes), pigment pastes (e.g. carbon black) and other additives (for example catalysts, antioxidants).

In comparison with sealants, adhesives have higher tensile shear strength values and lower extension values, in other words adhesives are hard to flexible and sealants flexible to plastic.

Epoxy Resins can be:

Epoxy resins are produced for example by condensation of 2,2-bis-(4-hydroxyphenyl)propane, also known as bisphenol A, and epichlorohydrin in a basic environment. Depending on the equivalents of both educts that are used, glycidyl ethers of varying molar mass are produced. In recent years epoxy resins based on bisphenol F, novolak epoxy resins and cycloaliphatic and heterocyclic epoxy resins have also gained in importance.

Since epoxy resins alone are poor film formers, molecule enlargement by means of suitable crosslinking agents is required. Polyamines, polyaminoamides, carboxylic anhydrides and dicyandiamides, for example, are used as crosslinking agents for epoxy resins. Among amine hardeners a distinction is made between aliphatic, cycloaliphatic, aromatic and araliphatic polyamines. Curing takes place with no elimination of reaction products. In this process a reactive hydrogen atom is generally added to the epoxy group to form a hydroxyl group.

Polyurethane Resins can be:

Polyurethanes, also known as polyisocyanate resins, are derived from isocyanic acid. As an extremely reactive compound, it adds very readily to compounds having an active (mobile) hydrogen atom. In this reaction the double bond between the nitrogen and the carbon is split, the active hydrogen being bonded to the nitrogen and the R2-O group to the carbon to form a urethane group. In order to obtain higher-molecular-weight crosslinked polyurethanes such as are needed for adhesive and sealant films, starting products having at least two functional groups, such as diisocyanates or triisocyanates, for example diphenylmethane-4,4-diisocyanate (MDI), having polymeric components or reaction products of toluylene diisocyanate (TDI) and polyols), and polyhydric alcohols (diols or polyols, compounds having several hydroxyl functions in the molecule), can be provided as reaction partners. Such alcohols can also take the form of saturated polyesters, for example, which are produced with an excess of polyalcohols.

Two-component reactive adhesives consist of a low-molecular-weight polyisocyanate and a likewise comparatively low-molecular-weight polyester polyol, for example polyalkylene polyadipate. When the two components are combined, urethane groups form in the adhesive or in the adhesive film.

One-component reactive adhesives consist of a higher-molecular-weight polyisocyanate polyurethane, which reacts with atmospheric moisture and sets in this way. Here too there are basically two mutually reactive chemical components, but only one physical component is added to process the adhesive. Since the simple low-molecular-weight polyisocyanates form relatively hard and brittle adhesive films with low strength values when reacted with moisture, pre-crosslinked polymers known as prepolymers are used for one-component systems. These compounds are produced from higher-molecular-weight polyols having a stoichiometric excess of isocyanate. This results in compounds which already have urethane bonds but which at the same time still have reactive isocyanate groups which are accessible to the reaction with moisture. The reaction with water proceeds with formation of a urea bond. The primary amines that form during the decomposition reaction immediately react with other isocyanate groups to form polyureas. In the case of one-component systems the cured polymer thus contains both urethane and urea compounds.

Solvent-containing polyurethane adhesives are available as physically setting and chemically reacting systems. In physically setting systems the polymer takes the form of a high-molecular-weight hydroxyl polyurethane, methyl ethyl ketone for example being used as the solvent. In addition to the hydroxyl polyurethane, chemically reacting systems also contain a polyisocyanate as crosslinking agent and as a second component.

Dispersion adhesives contain a high-molecular-weight polyurethane dispersed in water.

In heat-activated polyurethane adhesives the isocyanate component is "capped" or "blocked" in a compound, which only releases the isocyanate component at elevated temperature.

Reactive polyurethane hot-melt adhesives are produced using higher-molecular-weight, crystallising and fusible diol and isocyanate components. These are applied to the adherends at temperatures of around 70° C. to 120° C. as hot-melt adhesives. After cooling (physically setting), the bonded joint has sufficient initial strength to allow rapid further processing. Crosslinking via urea bonds (chemical reaction) then takes place through the additional action of moisture on the remaining reactive isocyanate groups to form the adhesive film polymer.

Silane-Terminated Polymers can be:

The term silane-terminated or silane-modified polymers includes all prepolymers which at the chain ends—or laterally—carry silyl groups having at least one hydrolysable bond but which in the polymer framework do not display the siloxane bond $(SiR_2O)n$ that is typical of silicones.

It can generally be assumed that irrespective of its chemical structure, any silane-modified polymer displays the properties of a hybrid: curing takes place in the same way as for silicones and the other properties are influenced by the various basic polymer frameworks that are possible between the silyl groups. Silane-terminated or silane-modified polymers can be classed in terms of their structure between polyurethanes and silicones.

Synthesis of the silane-modified polymer involves several steps. The starting basis is dihydric or trihydric polyoxypropylene glycol, which is converted into the corresponding bis-allyl compound. This is reacted to the desired end product bis-(3-(methyldimethoxysilyl) propyl) polyoxypropylene.

The silyl groups that are introduced into the chains in this way crosslink via mechanisms such as are known in silicone chemistry, in other words releasing small amounts of water or methanol, producing a flexible and insoluble network.

There are also other methods of obtaining sealants and adhesives based on silicone-modified polymers, for example the reaction of NCO-terminated prepolymers with correspondingly reactive aminosilanes or mercaptosilanes to form the desired compounds. The polymer backbone can contain all conceivable, reasonable structural elements, such as ether, ester, thioether or disulfide bridges. The opposite case, wherein an NH2-, SH- or OH-terminated prepolymer can be reacted with an isocyanate silane, is likewise conceivable. The addition of terminal mercapto groups (either in the prepolymer or in the silane) to C—C double bonds offers another technically interesting route.

Silicones can be:

Silicones differ fundamentally from all other organic polymeric substances, which are constructed from carbon chains or rings. Two features are typical of silicones:

construction from silicon-oxygen bonds (siloxane bonds) as molecule-linking elements a content of hydrocarbon groups as substituents, generally methyl groups, more rarely phenyl groups.

They are diorganopolysiloxanes based on linear or predominantly linear molecules and having terminal silanol end groups. According to chemical terminology silicones are classed as polyorganosiloxanes, in their basic framework they display a purely inorganic structure, which is supplemented by the incorporation of organic groups; the silicon atom is capable of binding one or more organic groups.

The following two reaction mechanisms can be used for curing to form adhesive films or adhesive seals:

One-Component Room Temperature Curing (RTC) Systems:

The setting process occurs at room temperature due to atmospheric humidity (=RTC-1, room temperature curing). Starting products are polydimethyl siloxanes. To inhibit self-condensation to the hydroxyl groups as described above and hence premature polymerisation, the terminal OH groups are blocked by so-called crosslinking agents. These crosslinking agents have two functions. Firstly, as mentioned above, to ensure that the OH groups remain blocked until the adhesive is used and secondly, when moisture enters the joint filled with adhesive or sealant, to allow crosslinking to form the polymer. At this stage the crosslinking agent acts as a "blocker" for the OH groups whilst at the same time multiplying the functional groups for subsequent crosslinking. In terms of their chemical structure the crosslinking agents are hydrolysis-sensitive substances. They are divided into basic compounds (compounds having primary amino groups), acid compounds (compounds having an acetoxy group) and neutral compounds (compounds having e.g. alkoxy groups or acid amide groups). The setting process occurs under the influence of moisture, which leads to a hydrolysis of the crosslinking agent and the release of the resulting decomposition product with simultaneous crosslinking of the siloxane chains via oxygen bridges.

Two-Component Room Temperature Curing Systems

These systems, which are known as RTC-2, are used in particular where RTC-1 systems no longer cure or cure too slowly due to low atmospheric humidity or excessive adhesive film thicknesses or surface areas. There are two different types of reaction:

Condensation Crosslinking:

The two components consist of a silicon ester and a hydroxypolysiloxane. Under the action of a catalyst that is added to it (organotin compound) the silicon ester is able to bind four siloxane molecules whilst also eliminating alcohol. This produces highly branched network structures.

Addition Crosslinking:

In this case the two components consist of a siloxane having a terminal vinyl group and a siloxane having silicon-hydrogen bonds. Under the action of a catalyst addition crosslinking occurs without formation of a secondary product. The silicon atoms are thus mutually linked to one another both via oxygen atoms and via two methylene groups.

Unsaturated Polyester Resins can be:

They are obtained by a polycondensation of unsaturated and saturated dicarboxylic or polycarboxylic acids with alcohols. If the reaction is controlled appropriately, the double bonds remain in the acid and/or the alcohol and allow reactions with unsaturated monomers, for example styrene, according to the principle of polymerisation. The following unsaturated dicarboxylic acids are used: maleic anhydride, maleic acid, fumaric acid.

Saturated Dicarboxylic Acids:

Ortho-phthalic acid or ortho-phthalic anhydride, isophthalic acid, terephthalic acid, tetrahydrophthalic acid, hexahydrophthalic acid, adipic acid, azelaic acid, sebacic acid, HET acid, tetrabromophthalic acid The Following Glycols are Used:

Propylene glycol-1,2, ethylene glycol, butylene glycol, neopentyl glycol, 2,2,4-trimethyl-pentanediol-1,3, dibromoneopentyl glycol, diethylene glycol, triethylene glycol, dipropylene glycol, pentaerythritol diallyl ether, dicyclopentadiene Monomers for Crosslinking:

Styrene, alpha-methyl styrene, meta- and para-methyl styrene, methyl methacrylate, diallyl phthalate, triallyl cyanurate This is not an exhaustive list of the number of possible starting substances; the person skilled in the art will also be able to use other compounds, depending on the raw material situation. The addition of dicyclopentadiene is also customary, causing the reactivity of the resins to be modified. The so-called "unsaturated polyester resins" that are formed can be used as such or in conjunction with reactive monomers. Reactive monomers are styrene, stilbene, esters of acrylic acid, esters of methacrylic acid, diallyl phthalate and other unsaturated compounds, provided that they display a sufficiently low viscosity and adequate miscibility with the unsaturated polyester resin.

Vinyl Resins can be:

On the chemical side vinyl ester resins have a certain species relationship with UP resins, particularly with regard to curing reaction, processing technology and area of use. They are polyadducts of liquid epoxy resins and acrylic acid. Through the reduction of ester groups in the molecule chain these resins are more resistant to hydrolysis whilst also displaying good elasticity and impact resistance. The same monomers are used for crosslinking as in the case of the unsaturated polyester resins, particularly styrene.

Acrylates can be:

The collective term acrylate-based adhesives includes all reactive adhesives which cure via the carbon-carbon double bond in the acrylic group.

Methacrylic acid esters and alpha-cyanoacrylic acid esters have become particularly important in adhesive formulations. Acrylate adhesives are cured by polymerisation, during which process a chain reaction is triggered by an initiator which leads to a continuous of molecules (monomers) via the carbon double bond to produce the cured adhesive. Polymerisation of the "acrylate" adhesives can be initiated by radicals (radical polymerisation), but also by anions (anionic polymerisation) in the case of alpha-cyanoacrylates. Depending on which polymerisation mechanism is used for curing, the acrylate adhesives are also divided into the following groups:

anionically curing adhesives: alpha-cyanoacrylate 1-component adhesives radically curing adhesives: anaerobic 1-component adhesives radically curing adhesives: 2-component adhesives In the case of sealants based on polyacrylic acid esters or acrylic acid ester copolymers and polymethacrylic acid esters, a distinction is made between solvent-containing and aqueous systems. Polyacrylate sealants cure physically by evaporation of the solvent or of the dispersion water.

Polyvinyl Acetates can be:

Polyvinyl acetate is the polymerisation product of vinyl acetate. Owing to the highly polar acetate group in the molecule, polyvinyl acetate has very good bonding properties on many adherend surfaces. It is mainly used as a dispersion adhesive with around 50 to 60% solids content, in some cases also on the basis of vinyl acetate copolymerisation (with vinyl chloride for example).

Polyvinyl Alcohols can be:

Polyvinyl alcohol is formed as a saponification product of polyvinyl acetate and other analogous polyesters. Depending on the molecular weight, the polyvinyl alcohol takes the form of a more or less highly viscous liquid. It is used for example for gluing cellulose-containing materials such as paper, cardboard, wood, etc., also as a protective colloid for stabilising and increasing the setting speed of dispersion adhesives.

Polyvinyl Ethers can be:

Of the polyvinyl ethers, the following three polymers in particular are of interest as raw materials for adhesives:

polyvinylmethyl ether
polyvinylethyl ether
polyvinylisobutyl ether

Polyvinyl ethers having a moderate degree of polymerisation are tacky soft resins which have very good bonding properties on porous and smooth surfaces. Polyvinylmethyl ether is characterised in particular in that because of its water solubility it can also be wetted again and therefore when mixed with dextrin or animal glues as a rubberised coating on paper labels, for example, it gives them improved adhesion. Due to their permanent tackiness polyvinyl ethers are also used in pressure-sensitive adhesives (contact-bonding adhesives).

Ethylene Vinyl Acetates can be:

Copolymers of ethylene and vinyl acetate. In the molecular structure the vinyl acetate molecules are randomly incorporated into the ethylene chain. Whilst polyvinyl acetate is relatively unstable when exposed to high temperatures due to release of acetic acid, copolymers with ethylene are substantially more resistant in terms of oxidation and thermal degradation. For that reason EVA copolymers (containing approx. 40% vinyl acetate) belong to an important group of raw materials for hot-melt adhesives.

Ethylene-Acrylic Acid Copolymers can be:

Copolymers of ethylene and acrylic acid or acrylic acid esters.

These copolymers, which combine the chemical resistance of polyethylene with the good properties of the acid or ester grouping, are important base polymers for hot-melt adhesives. Ethyl acrylate is preferably used as the ester component.

Polyvinyl Acetals can be:

Polyvinyl acetals are formed by the action of aldehydes on alcohols. The most important acetals for adhesives production are
  polyvinyl formal
  polyvinyl butyral Both serve as a plasticising component for phenolic resin-based adhesives, whilst polyvinyl butyral is also used as a self-adhesive film in laminated safety glass.

Polystyrene can be:

Polymerisation product of styrene.

The monomer (monostyrene) is used as a component for adhesive raw materials primarily in two areas:
  as a copolymer with plasticising monomers, particularly butadiene, for the production of styrene-butadiene dispersions,
  as a "polymerisable" solvent for copolymerisation with unsaturated polyesters Polyvinyl Chloride can be:

Polyvinyl chloride is the polymerisation product of vinyl chloride.

It is used as a raw material particularly for plastisol adhesives, also as a copolymer with vinyl acetate for vinyl chloride/vinyl acetate copolymers in solvent adhesives, dispersion adhesives, heat-sealing adhesives and as a high-frequency welding auxiliary.

Styrene-Butadiene Rubber can be:

Styrene-butadiene rubber is a typical example of a thermoplastic elastomer which combines the application properties of elastomers with those of thermoplastics. Styrene-butadiene copolymer (SBS) or styrene-isoprene copolymer (SIS) is a so-called three-block copolymer, which has a linear structure comprising sequences of the same monomer units in separate blocks. The end blocks are polystyrene segments, the middle block polybutadiene (styrene-butadiene-styrene block copolymers SBS) or isoprene (styrene-isoprene-styrene block polymers SIS).

The ratio of the styrene to the butadiene (isoprene) component is around 1:3. In contrast to adhesive film polymers, which owe their elastic properties to the addition of plasticiser, a so-called "internal plasticisation" is achieved in this way. A particular advantage of these rubber copolymers is their ability to form adhesive films with good adhesion properties and high flexibility. For that reason a substantial application is where the mutually bonded adherends are subject to high deformation loads in practical use, e.g. in the case of footwear or rubber/rubber or rubber/metal bonds.

Chloroprene Rubber (CR) can be:

Chloroprene rubber (polychloroprene) is formed as a polymerisation and copolymerisation product of chloroprene (2-chlorobutadiene). In addition to good adhesion properties the linear macromolecules have a strong crystallisation tendency, which contributes to a relatively high strength in the adhesive film. These polymers or copolymers are important raw materials for contact adhesives. The double bond that is present in the polychloroprene molecule allows it to undergo additional crosslinking reactions with correspondingly reactive molecule groups. Isocyanates and phenolic resins serve as heat curing components here.

In polychloroprene latices the base polymers are dispersed with the appropriate additives (tackifying resins, etc.) in the aqueous phase by means of suitable emulsifiers and/or protective colloids.

Nitrile Rubber (NBR) can be:

Nitrile rubber is a copolymer of butadiene having a content of around 20 to 40% acrylonitrile. The high acrylonitrile content gives these polymers good resistance to plasticisers, making them very suitable for bonding plasticised plastics, for example.

Butyl Rubber can be:

Butyl rubber is a copolymer comprising a predominant proportion (<97%) of isobutylene with isoprene (<5%). This linear chain molecule contains very high proportions of chain elements of a saturated nature in the form of the long polyisobutylene segments, on which no additional crosslinking reactions are possible. The only crosslinkable component is the isoprene molecule, so the overall properties of the butyl rubber are determined by the proportion of double bonds governed by the isoprene.

The reactivity can be further influenced by incorporating chlorine- or bromine-containing monomers.

Polysulfide can be:

Raw materials for polysulfide sealants have long been known under the trade name Thiokol®. Polysulfide polymers are obtained by reacting dichloroethyl formal with sodium polysulfide.

The molecular weight of the liquid polymers is between 3000 and 4000. They can be converted to a rubbery-elastic final state by reaction with an oxidising agent, for example manganese dioxide.

Polyethylene can be:

Is produced as the polymerisation product of ethylene. The low-molecular-weight types, having a melt flow index in the range from 2 to 2000 g/10 min, are used together with tackifying resins and microwaxes as hot-melt adhesives in the paper and cardboard industry.

Polypropylene can be:

Is produced as the polymerisation product of propylene.

Polypropylene is used as a raw material for hot-melt adhesives with moderate strength properties, and specifically as atactic polypropylene.

Fluorinated Hydrocarbons can be:

Polyfluoroethylene-propylene is a copolymer of tetrafluoroethylene and hexafluoropropylene and has been tested as a raw material for hot-melt adhesives. The advantage of these products lies in their high long-term thermal endurance.

Polyamides can be:

Polyamides are one of the most important raw materials for physically setting hot-melt adhesives. The reactions described below, which conventionally proceed in the melt under a nitrogen atmosphere, are suitable for preparing polyamides:
  polycondensation of diamines with dicarboxylic acids
  polycondensation of aminocarboxylic acids
  polycondensation from lactams
  polycondensation of diamines with dimerised fatty acids Saturated Polyesters and Copolyesters can be:
Saturated polyesters and copolyesters are formed by polycondensation from dicarboxylic acids and diols. They are an important raw material for hot-melt adhesives.
Phenol-Formaldehyde Resins can be:
These polymers are produced by a polycondensation reaction between phenol and formaldehyde, producing highly crosslinked phenolic resins, which are used as a raw material for adhesives for the aviation industry, for example. Pure phenol-formaldehyde resins generally display excessive brittleness. For that reason they are modified by copolymerisation or mixed condensation with thermoplastic polymers, for example with
  polyvinyl formal
  polyvinyl butyral
  elastomers, e.g. polychloroprene and nitrile rubber
  polyamides
  epoxy resins
Cresol/Resorcinol-Formaldehyde Resins can be:
In addition to phenol as a starting monomer for formaldehyde condensation, phenol derivatives such as cresols and resorcinol are also used as reaction partners.
Urea-Formaldehyde Resins can be:
A large number of nitrogen-containing organic compounds are capable of polycondensation with aldehydes. Urea and melamine in particular have gained importance for use as adhesives. In the case of urea-formaldehyde resins the reaction process takes place initially in the form of an addition reaction in slightly acid solution. The actual polycondensation reaction, which leads to the formation of the polymeric adhesive film, leads to highly crosslinked polymers via the formation of either an ether bridge or a methylene bridge.
Melamine-Formaldehyde Resins can be:
Like urea, melamine also reacts with formaldehyde to form methylol compounds. As with the urea reactions, polycondensation proceeds in the case of these compounds too via methylene or methylene ether linkages to produce high-molecular-weight, highly crosslinked, hard and in some cases brittle adhesive films.
Polyimides can be:
Experiments using polyimides originate from attempts to provide organically based adhesives for exposure to high temperature.
Polyimides for use in technical applications are produced by reacting the anhydrides of tetrabasic acids, such as pyromellitic anhydride, with aromatic diamines, for example diaminodiphenyl oxide. They are used as an adhesive starting from a pre-condensate in the form of solutions or films.
Polybenzimidazoles can be:
Polybenzimidazoles can likewise be classed as high-temperature-resistant adhesives. They are produced by a polycondensation reaction from aromatic teramines with dicarboxylic acid.
Polysulfones can be:
Polysulfones likewise belong to the group of heat-resistant adhesives. They are obtained for example by a polycondensation reaction from dihydroxydiphenyl sulfone with bisphenol A.
The silica used can display a compacted bulk density of 60 g/l to 200 g/l.
Pyrogenic silicas are known from Ullmanns Enzyklopädie der technischen Chemie, 4$^{th}$ Edition, Volume 21, page 464 (1982). They are produced by flame hydrolysis from evaporating silicon compounds, such as e.g. silicon tetrachloride, in an oxyhydrogen flame.
The pyrogenically produced silicas can be rendered hydrophobic by means of halogen-free silanes.

Compaction can be performed using a roller compactor. Compaction can preferably be performed using a pressing belt filter in accordance with EP 0 280 851 B1.

The following silicas, for example, having the following grouping, can be used as pyrogenically produced, hydrophobic, compacted silicas (see also Table 1):

AEROSIL® R 202 VV 60

AEROSIL® R 202 VV 90

Grouping:

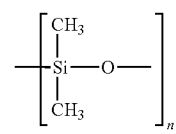

AEROSIL® R 805 VV 60

AEROSIL® R 805 VV 90

Grouping:

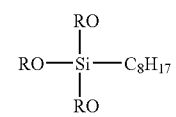

AEROSIL® R 812 VV 60

AEROSIL® R 812 VV 90

Grouping:

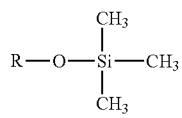

AEROSIL® R 812S VV 60

AEROSIL® R 812S VV 90

Grouping:

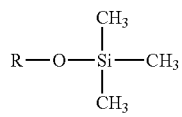

The compacted bulk density of these silicas can be 60 g/l to 200 g/l.

Hydrophobing can be performed for example with a silicone oil, with an octyl silane, with hexadimethyl disilazane, with a methacrylate silane or with an octamethyl cyclotetrasiloxane.

The carbon content of the pyrogenically produced silicas can be 1.0 to 6.5 wt. %.

The pyrogenically produced silicas can display a BET surface area of 80 to 290 m$^2$/g.

The physico-chemical properties of these silicas are set out in Table 1.

TABLE 1

| Test method | Aerosil® R202 | Aerosil® R805 | Aerosil® R812 | Aerosil® R812S | Aerosil® R104 | Aerosil® R106 | Aerosil® R816 | Aerosil® R711 |
|---|---|---|---|---|---|---|---|---|
| Behaviour towards water | hydrophobic | | | | | | | |
| Appearance | Loose white powder | | | | | | | |
| BET[1)] surface area m²/g | 100 ± 20 | 150 ± 25 | 260 ± 30 | 220 ± 25 | 150 ± 25 | 250 ± 30 | 190 ± 20 | 150 ± 25 |
| Average size of primary particles | 14 | 12 | 7 | 7 | 12 | 7 | 12 | 12 |
| Compacted bulk density[2)] approx. value normal product g/l | 50 | 50 | 50 | 50 | 50 | 50 | 40 | |
| compacted product (additive "V")[12)] g/l | | | | | 90 | | | |
| VV product (additive: "VV")[13)] g/l | 60/90 | 60/90 | 60/90 | 60/90 | 60/90 | 60/90 | 60/90 | 60/90 |
| Loss on drying[3)] (2 h at 105° C.) on leaving the supplier wt. % | ≦0.5 | ≦0.5 | ≦0.5 | ≦0.5 | | | ≦1.0 | ≦1.5 |
| Loss on ignition[4)7)] wt. % (2 h at 1000° C.) | 4-6 | 5-7 | 1.0-2.5 | 1.5-3.0 | | | 2.0-4.0 | 6.0-11.0 |
| C content | 3.5-5.0 | 4.5-6.5 | 2.0-3.0 | 3.0-4.0 | 1-2 | 1.5-3.0 | 1.2-2.2 | 4.5-6.5 |
| pH[5)10)] | 4-6 | 3.5-5.5 | 5.5-7.5 | 5.5-7.5 | ≧4.0 | ≧3.7 | 4.0-5.5 | 4.0-6.0 |
| SiO$_2$[8)] | ≧99.8 | ≧99.8 | ≧99.8 | ≧99.8 | ≧99.8 | ≧99.8 | ≧99.8 | ≧99.8 |
| Al$_2$O$_3$[8)] | ≦0.05 | ≦0.05 | ≦0.05 | ≦0.05 | ≦0.05 | ≦0.05 | ≦0.05 | ≦0.05 |
| Fe$_2$O$_3$[8)] | ≦0.01 | ≦0.01 | ≦0.01 | ≦0.01 | ≦0.01 | ≦0.01 | ≦0.01 | ≦0.03 |
| TiO$_2$[8)] | ≦0.03 | ≦0.03 | ≦0.03 | ≦0.03 | ≦0.03 | ≦0.03 | ≦0.03 | ≦0.03 |
| HCl[11)] | ≦0.025 | ≦0.025 | ≦0.025 | ≦0.025 | ≦0.02 | ≦0.025 | ≦0.025 | ≦0.01 |
| Container size (net)[12)] kg | 10 | 10 | 10 | 10 | 10 | 10 | 10 | 10 |

[1)] by reference to DIN 66131
[2)] by reference to DIN ISO 787/11, JIS K 5101/18 (not screened)
[3)] by reference to DIN ISO 787/2, ASTM D 280, JIS K 5101/21
[4)] by reference to DIN 55921, ASTM D 1208, JIS K 5101/23
[5)] by reference to DIN ISO 787/9, ASTM D 1208, JIS K 5101/24
[7)] based on the substance dried for 2 h at 105°
[8)] based on the substance annealed for 2 h at 1000°
[8)] in water:methanol = 1:1
[11)] HCl content is a component of the loss on ignition
[12)] V product is supplied in bags of net weight 15 kg
[13)] VV 60 is supplied in 10 kg bags, VV 90 in 15 kg bags.

VV 60 denotes compacted silica with a compacted bulk density of approx. 60 g/l, and VV 90 denotes compacted silica with a compacted bulk density of approx. 90 g/l.

AEROSIL® R 202, AEROSIL® R 805, AEROSIL® R 812 and AEROSIL® R 812S each have compacted bulk densities of approx. 50 g/l.

With these silicas it is possible according to the invention to reduce the time needed to produce thixotropic adhesives and sealants as compared to standard compacted silicas, whilst retaining equally good rheological and applicational properties. This time saving in the production of thixotropic adhesives and sealants can reduce costs.

According to the invention it is surprising that compacted, hydrophobic, pyrogenic silicas differ markedly from compacted, hydrophilic, pyrogenic silicas. For example, the viscosities of the various thixotropic adhesive and sealant systems do not decrease significantly with increasing compaction, and other applicational properties, such as e.g. flow behaviour on inclined and vertical surfaces, do not deteriorate, provided that suitably high shear forces are applied during the dispersion process. The incorporation of the compacted hydrophobic silicas into the various adhesive and sealant raw materials is markedly shorter than is the case with standard compacted hydrophobic silicas, which display compacted bulk densities of approx. 50 g/l.

This means that the various adhesive and sealant systems can be produced in a shorter time. This denotes an improvement over the prior art.

Through the reduction that is achieved in the incorporation time for the compacted, hydrophobic, pyrogenic silica, the temperature increase during the incorporation process is also reduced. This reduction in the temperature increase is particularly advantageous for highly viscous, heat-sensitive structural adhesives and sealants, based for example on polyester resin, vinyl ester resin, epoxy resin, polyurethane resin, which are produced in large batches with high-speed production mixers or similar dispersing units, since overlong incorporation of the silica into the highly viscous polymer systems can lead to localised overheating, which can damage the polymer systems. This risk is reduced by the shorter incorporation time for these compacted, hydrophobic, pyrogenic silicas.

The reduction in the temperature increase during the incorporation process also brings about a reduction in the emission of toxic, highly volatile substances, such as e.g. styrene, epichlorohydrin or polyamines, allowing the costs for large-scale extraction plants to be reduced.

Depending on the adhesive and sealant formulation and shear forces, the viscosities of the adhesive and sealant systems which are rendered thixotropic with the compacted hydrophobic, pyrogenic silicas are slightly lower in comparison to the standard compacted, hydrophobic, pyrogenic silicas. This is advantageous for adhesive and sealant manufacturers, who can thus produce adhesive and sealant systems with two different rheologies without changing their formulation, simply by changing process parameters such as mixer speed and residence time of the composition in the mixing device; very highly viscous and thixotropic and slightly less highly viscous and thixotropic adhesive and sealant systems. Costs can be reduced in this way, since a second formulation does not have to be produced.

Other advantages that are achieved with these more highly compacted, hydrophobic, pyrogenically produced silicas are reduced dust formation and lower volume, which can be advantageous in plant design, for example.

Applications of the highly viscous, thixotropic adhesive and sealant systems according to the invention are for example bonded joints in metals and plastics, bonded joints and seals in glass facades for hotels, bonded joints in shipbuilding, plant construction, wind-driven power station construction and automotive construction.

EXAMPLES

Example 1

Adhesives Based on Epoxy Resin

The AEROSIL® substances used are pyrogenically produced silicon dioxides:
AEROSIL® R 202
AEROSIL® R 202 VV 60
AEROSIL® R 202 VV 90
Test Formulation for Epoxy Resin

| Component A: (resin component) | 94.4% Araldit M (bisphenol A resin) 5.6% AEROSIL ® R 202 (pyrogenic silica) |
| --- | --- |
| Component B: (hardener comp.) | 90.9% Euredur 250 (polyaminoamide hardener) 9.1% HY 960 (tert. amine as accelerator) |

Example 1

Procedure

Direct addition of the silica to the epoxy resin. Total wetting of the silica with the resin in a high-speed laboratory mixer (diameter 5 cm, Cowles disc) at 1000 rpm. Measurement of the incorporation time. Dispersion in the high-speed laboratory mixer at 3000 rpm, 5 min. Then aeration of the samples. Storage of the resin/silica mixture for 1.5 h at 25° C., then incorporation of the hardener component heated to 25° C. for 1 min at 1000 rpm; measurement of the viscosity with a Brookfield rotary viscometer at 2.5 rpm and 20 rpm, immediately after addition of the hardener and after 15 min, 30 min and 45 min. Calculation of the thixotropy indexes.

the case of AEROSIL® R 202 VV 60 and AEROSIL® R 202 VV 90 are likewise very comparable with AEROSIL® R 202, in other words the viscosities remain almost constant during curing, such that the thixotropic epoxy resin does not run on inclined or vertical surfaces.

The table for Example 1 compares the incorporation time for all three AEROSIL® grades, in other words the time until the AEROSIL was completely wetted with the epoxy resin and had disappeared from the surface. AEROSIL® R 202 VV 90 has the advantage here of a significantly shorter incorporation time as compared with AEROSIL® R 202 and AEROSIL® R 202 VV 60. Furthermore, the dust formation with AEROSIL® 202 VV 90 is lower than with AEROSIL® R 202 and AEROSIL® R 202 VV 60. Moreover, the lower volume of AEROSIL® R 202 VV 90 is also advantageous in terms of the design of dispersing units.

Example 2

Adhesives Based on Epoxy Resin

The AEROSIL® substances used are pyrogenically produced silicon dioxides:
AEROSIL® R 202
AEROSIL® R 202 VV 60
AEROSIL® R 202 VV 90
AEROSIL® R 805
AEROSIL® R 805 VV 60
AEROSIL® R 805 VV 90
Procedure:
Test Formulation for Epoxy Resin

| Component A: (resin component) | 92.0% Araldit M (bisphenol A resin) 8.0% AEROSIL ® R 202 (pyrogenic silica) |
| --- | --- |
| Component B: (hardener comp.) | 90.9% Euredur 250 (polyaminoamide hardener) 9.1% HY 960 (tert. amine as accelerator) |

Direct addition of the silica to the epoxy resin. Total wetting of the silica with the resin in a high-speed laboratory mixer (diameter 5 cm, Cowles disc) at 1000 rpm. Measure-

TABLE 2

Test results from Example 1

| Description | Incorporation time in sec. | Viscosity in Pas before addition of hardener | Thix. index | Viscosity in Pas after addition of hardener | after 15 min | 30 min | 45 min |
| --- | --- | --- | --- | --- | --- | --- | --- |
| Sample 1: Aerosil ® R202 | 142 | 398 | 5.2 | 51 | 48 | 47 | 45 |
| Sample 2: Aerosil ® R 202 VV 60 | 140 | 398 | 5.2 | 50 | 47 | 46 | 44 |
| Sample 3: Aerosil ® R 202 VV 90 | 34 | 368 | 5.1 | 49 | 48 | 45 | 43 |

Analysis:

The thickening and thixotropic effect of AEROSIL® R 202 VV 60, both in Araldit M and after addition of the hardener, is almost identical to that of AEROSIL® R 202, in the case of AEROSIL® R 202 VV 90 it decreases slightly due to the higher compacted bulk density as compared with AEROSIL® R 202. The viscosity reductions at the start of curing in ment of the incorporation time. Dispersion in the high-speed laboratory mixer at 3000 rpm, 5 min. Then aeration of the samples. Storage of the resin/silica mixture for 1.5 h at 25° C., then incorporation of the hardener component heated to 25° C. for 1 min at 1000 rpm; measurement of the viscosity with a Brookfield rotary viscometer at 2.5 rpm and 20 rpm, immediately after addition of the hardener and after 15 min, 30 min and 45 min. Calculation of the thixotropy indexes.

TABLE 3

Test results from Example 2

| Description | Incorporation time | Viscosity in Pas before addition of hardener | Thix. index | Viscosity in Pas after addition of hardener | immediately, after 15 min | 30 min | 45 min |
|---|---|---|---|---|---|---|---|
| Sample 4: Aerosil ® R 202 | 298 | 1045 | 5.9 | 168 | 174 | 160 | 153 |
| Sample 5: Aerosil ® R 202 VV 60 | 82 | 1118 | 6.4 | 149 | 146 | 140 | 134 |
| Sample 6: Aerosil ® R 202 VV 90 | 58 | 1112 | 6.4 | 127 | 129 | 124 | 120 |
| Sample 7: Aerosil ® R 805 | 257 | 378 | 4.7 | 103 | 91 | 77 | 64 |
| Sample 8: Aerosil ® R 805 VV 60 | 51 | 368 | 4.6 | 98 | 90 | 74 | 63 |
| Sample 9: Aerosil ® R 805 VV 90 | 30 | 296 | 4.5 | 89 | 82 | 71 | 53 |

Analysis:

The thickening and thixotropic effects of AEROSIL® R 202 VV 60 and AEROSIL® R 202 VV 90 in Araldit M are almost identical to those of AEROSIL® R 202; after addition of the hardener the formulations with AEROSIL® R 202 VV 60 and AEROSIL® R 202 VV 90 display somewhat lower viscosities than the formulation with AEROSIL® R 202. Both AEROSIL® R 202 VV 60 and AEROSIL® R 202 VV 90 have the advantage here of a significantly shorter incorporation time in comparison to AEROSIL® R 202.

The thickening and thixotropic effects of AEROSIL® R 805 VV 60 and AEROSIL® R 805 VV 90, both in Araldit M and after addition of the hardener, are somewhat lower than is the case with AEROSIL® R 805. Both AEROSIL® R 805 VV 60 and AEROSIL® R 805 VV 90 have the advantage here of a significantly shorter incorporation time in comparison to AEROSIL® R 805.

Example 3

Weighing out of Desmoseal M 100, followed by Mesamoll. Addition of Dynasylan Glymo, followed by homogenisation with a high-speed laboratory mixer at 1000 rpm. Addition of Omya BLP-3 and homogenisation with the high-speed mixer at 1000 rpm. Addition of AEROSIL®. Homogenisation with the high-speed mixer at 1000 rpm and dispersion for 10 min. at 3000 rpm in vacuo. Determination of rheological properties at 25° C. and of the flow behaviour in accordance with ASTM-D-2202. In this test the sealant is introduced into a standardised test block and stored in a vertical position at room temperature. The distance traveled by the lower edge of the sealant in the block is measured in mm.

The AEROSIL® substances used are pyrogenically produced silicon dioxides:

AEROSIL® R 202

AEROSIL® R 202 VV 60

AEROSIL® R 202 VV 90

A simple 1-component polyurethane sealant formulation based on Desmoseal M 100 is used for the examples, it also being possible to use MDI prepolymers to produce polyurethane adhesives.

1-Component Polyurethane Sealant Test Formulation:

| | wt. % |
|---|---|
| Desmoseal(R) M 100 (PU prepolymer) | 35 |
| Mesamoll (R) (plasticiser) | 25 |
| Omya(R) BLP3 (chalk) | 33.7 |
| Dynasylan (R) Glymo (silane) | 0.3 |
| AEROSIL ® R 202 (pyrogenic silica) | 6.0 |

TABLE 4

Test results from Example 3

| | incorporation time in s | Yield point in Pa | Viscosity in Pa s | Flow behaviour mm |
|---|---|---|---|---|
| Sample 10: Aerosil ® R 202 | 92 | 280 | 90 | 2 |
| Sample 11: Aerosil ® R 202 VV 60 | 90 | 279 | 89 | 2 |
| Sample 12: Aerosil ® R 202 VV 90 | 55 | 242 | 79 | 2.5 |

Analysis:

Table 4 for Example 3 shows the viscosities and yield points and the flow behaviour of the 1-component polyurethane sealant rendered thixotropic with various AEROSIL® grades. Both the highest yield points and good comparable yield points and viscosities are obtained with AEROSIL® R 202 VV 60 and AEROSIL® R 202 VV 90. The yield points and viscosities of the 1-component polyurethane sealant are only slightly lower using AEROSIL® R 202 VV 90. The same differences are also found when the flow behaviour is measured. AEROSIL® R 202 VV 90 has the advantage here of a significantly shorter incorporation time in comparison to AEROSIL® R 202 VV 60 and AEROSIL® R 202.

Example 4

The AEROSIL® substances used are pyrogenically produced silicon dioxides:

AEROSIL® R 202

AEROSIL® R 202 VV 60

AEROSIL® R 202 VV 90

AEROSIL® R 812

AEROSIL® R 812 VV 60
AEROSIL® R 812 VV 90

Test Formulation: 6% pyrogenic silica in Derakane® Momentum

Procedure:

The vinyl ester resin Derakane® Momentum was used as the test resin. The silica concentration was 6 wt. %. Direct addition of the silica to the vinyl ester resin. Total wetting of the silica with the resin in a high-speed laboratory mixer (diameter 5 cm, Cowles disc) at 1000 rpm. Measurement of the incorporation time. Dispersion in the high-speed laboratory mixer at 3000 rpm, 5 min. Then aeration of the samples. Storage of the resin/silica mixture for 1.5 h at 25° C., measurement of the viscosities with the Brookfield rotary viscometer at 5 and 50 rpm. Calculation of the thixotropy index (TI).

TABLE 5

Test results from Example 4

| | Test results: | | |
|---|---|---|---|
| | Incorporation time in s | Thixotropy index | Viscosity in Pa s |
| Sample 13: ASTM-D 2202 Aerosil ® R 202 | 80 | 5.7 | 270 |
| Sample 14: Aerosil ® R 202 VV 60 | 39 | 5.7 | 245 |
| Sample 15: Aerosil ® R 202 VV 90 | 24 | 5.4 | 220 |
| Sample 16: Aerosil ® R 812 | 119 | 4.5 | 119 |
| Sample 17: Aerosil ® R 812 VV 60 | 75 | 4.1 | 80 |
| Sample 18: Aerosil ® R 912 VV 90 | 34 | 4.1 | 74 |

Analysis:

The thickening and thixotropic effects of AEROSIL® R 202 VV 60 and AEROSIL® R 202 VV 90 and of AEROSIL® R 812 VV 60 and AEROSIL® R 812 VV 90 respectively in Derakane® Momentum are somewhat lower than is the case with AEROSIL® R 202 and AEROSIL® R 812.

Both AEROSIL® R 202 VV 60 and AEROSIL® R 202 VV 90 have the advantage here of a significantly shorter incorporation time in comparison to AEROSIL® R 202. The same is true of AEROSIL® R 812 VV 60 and AEROSIL® R 812 AEROSIL® R VV 90 in comparison to AEROSIL® R 812.

Example 5

The AEROSIL® substances used are pyrogenically produced silicon dioxides:
AEROSIL® R 202
AEROSIL® R 202 VV 60
AEROSIL® R 202 VV 90
AEROSIL® R 812
AEROSIL® R 812 VV 60
AEROSIL® R 812 VV 90

Test Formulation: 6% pyrogenic silica in Palatal® A 410

Procedure:

The polyester resin Palatal A420 was used as test resin. The silica concentration was 6 wt. %.

Direct addition of the silica to the polyester resin. Total wetting of the silica with the resin in a high-speed laboratory mixer (diameter=50 cm, Cowles disc) at 1000 rpm. Measurement of the incorporation time. Dispersion in the high-speed laboratory mixer at 3000 rpm, 5 min. Then aeration of the samples. Storage of the resin/silica mixture for 1.5 h at 25° C., measurement of the viscosity with the Brookfield rotary viscometer at 5 and 50 rpm. Calculation of the thixotropy index (TI).

TABLE 6

Test results from Example 5

| | Test results: | | |
|---|---|---|---|
| | Incorporation time in s | Thixotropy index | Viscosity in Pa s |
| Sample 19: ASTM-D 2202 Aerosil ® R 202 | 50 | 6.0 | 218 |
| Sample 20: Aerosil ® R 202 VV 60 | 37 | 5.8 | 228 |
| Sample 21: Aerosil ® R 202 VV 90 | 18 | 6.6 | 267 |
| Sample 22: Aerosil ® R 812 | 63 | 4.8 | 151 |
| Sample 23: Aerosil ® R 812 VV 60 | 56 | 4.8 | 122 |
| Sample 24: Aerosil ® R 812 VV 90 | 19 | 4.0 | 60 |

Analysis:

The thickening and thixotropic effects of AEROSIL® R 202 VV 60 and AEROSIL® R 202 VV 90 and of AEROSIL® R 812 VV 60 and AEROSIL® R 812 VV 90 respectively in Palatal A 420 are somewhat lower than is the case with AEROSIL® R 202 and AEROSIL® R 812.

Both AEROSIL® R 202 VV 60 and AEROSIL® R 202 VV 90 have the advantage here of a significantly shorter incorporation time in comparison to AEROSIL® R 202. The same is true of AEROSIL® R 812 VV 60 and AEROSIL® R 812 VV 90 in comparison to AEROSIL® R 812.

The invention claimed is:

1. Adhesive and sealant composition comprising a member selected from the group consisting of polyurethane, unsaturated polyester resins, vinyl ester resins, acrylates, polyvinyl acetate, polyvinyl alcohol, polyvinyl ether, ethylene vinyl acetate, ethylene-acrylic acid copolymers, polyvinyl acetates, polyvinyl chloride, chloroprene rubber, nitrile rubber, butyl rubber, polysulfide, fluorinated hydrocarbons saturated polyesters and copolyesters, urea-formaldehyde resins, melamine-formaldehyde resins, polyimides, polybenzimidazoles, and polysulfones, containing 1 wt. % to 15 wt. % of a compacted hydrophobic, pyrogenic silica having a compacted bulk density of 60 g/l to 200 g/l, a BET surface area of 80 to 290 m²/g and a carbon content of 1.0 to 6.5 wt. %, wherein the silica has been compacted by a pressing filter belt and as a result of said silica being compacted in such way said adhesive and sealant composition is rendered thixotropic and the time required for incorporating said compacted hydrophobic pyrogenic silica into said adhesive and sealant composition is reduced compared to the time required for incorporation into said composition of silica that has not been compacted by a pressing filter belt, and wherein the silica has been made hydrophobic with a silicone oil, with an octyl silane, with hexadimethyl disilazane, with a methacrylate silane, or with an octamethyl cyclotetrasiloxane.

2. A method for reducing the time needed to incorporate compacted hydrophobic silicas into adhesives and sealant compositions in order to render them thixotropic comprising incorporating a compacted hydrophobic silica in the amount of 1 wt % to 15 wt % into a member selected from the group consisting of polyurethane, unsaturated polyester resins, vinyl ester resins, acrylates, polyvinyl acetate, polyvinyl alcohol, polyvinyl ether, ethylene vinyl acetate, ethylene-acrylic acid copolymers, polyvinyl acetates, polyvinyl chloride, chloroprene rubber, nitrile rubber, butyl rubber, polysulfide, fluorinated hydrocarbons saturated polyesters and copolyesters, urea-formaldehyde resins, melamine-formaldehyde resins, polyimides, polybenzimidazoles, and polysulfones, wherein the compacted hydrophobic silica has a compacted bulk density of 60 g/l to 200 g/l, a BET surface area of 80 to 290 m²/g and a carbon content of 1.0 to 6.5 wt. %, and wherein the silica has been compacted by a pressing filter belt and as a result of said silica being compacted in such way said adhesive and sealant compositions are rendered thixotropic and the time required for incorporating said compacted hydrophobic pyrogenic silica into said adhesive and sealant compositions is reduced compared to the time required for incorporation into such compositions of silica that has not been compacted by a pressing filter belt, and wherein the silica has been made hydrophobic with a silicone oil, with an octyl silane, with hexadimethyl disilazane, with a methacrylate silane, or with an octamethyl cyclotetrasiloxane.

3. The method according to claim 2 wherein the time needed to prepare thixotropic adhesives and sealants is shorter than would be the time required to prepare thixotropic adhesives and sealants using compacted hydrophobic silica having a compacted bulk density of 50 g/l.

4. The adhesive and sealant composition according to claim 1 wherein the silica is selected from the group consisting of

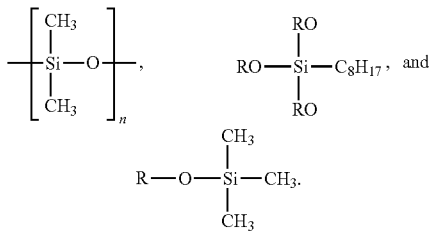

5. The method according to claim 2 wherein the silica is selected from the group consisting of

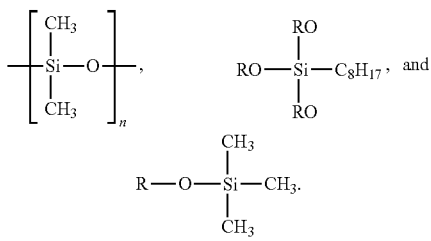

* * * * *